(12) United States Patent
Murray

(10) Patent No.: US 8,028,502 B2
(45) Date of Patent: Oct. 4, 2011

(54) FLEXIBLE POUCH AND METHOD OF FORMING A FLEXIBLE POUCH

(75) Inventor: R. Charles Murray, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 0 days.

(21) Appl. No.: 12/771,094

(22) Filed: Apr. 30, 2010

(65) Prior Publication Data

US 2010/0218462 A1 Sep. 2, 2010

Related U.S. Application Data

(62) Division of application No. 10/533,615, filed on Aug. 1, 2005, now Pat. No. 7,722,254.

(60) Provisional application No. 60/422,282, filed on Oct. 30, 2002.

(51) Int. Cl.
*B65B 1/04* (2006.01)

(52) U.S. Cl. .......... 53/469; 53/452; 53/133.1; 53/133.2; 53/410; 53/412; 53/479

(58) Field of Classification Search .................... 53/452, 53/455, 451, 133.1, 133.2, 562, 410, 412, 53/469, 477–481
See application file for complete search history.

(56) References Cited

U.S. PATENT DOCUMENTS

| | | | | |
|---|---|---|---|---|
| 2,928,216 A | | 3/1960 | Orsini | |
| 3,304,977 A | | 2/1967 | Hammons | |
| 3,849,965 A | * | 11/1974 | Dominici | 53/451 |
| 3,890,448 A | * | 6/1975 | Ito | 426/126 |
| 3,924,008 A | | 12/1975 | Ford et al. | |
| 4,361,235 A | | 11/1982 | Gautier et al. | |
| 4,718,215 A | * | 1/1988 | Carveth et al. | 53/410 |
| 5,231,817 A | * | 8/1993 | Sadler | 53/451 |
| 5,241,804 A | * | 9/1993 | Tsuruta et al. | 53/504 |
| 5,758,473 A | * | 6/1998 | Patelli | 53/412 |
| 6,289,654 B1 | * | 9/2001 | Yamaguchi et al. | 53/434 |
| 6,422,753 B1 | | 7/2002 | Thomas | |
| 6,592,918 B2 | * | 7/2003 | Kaeser | 426/115 |
| 7,546,722 B2 | * | 6/2009 | Tsuruta | 53/551 |
| 7,600,360 B2 | * | 10/2009 | Schroeder et al. | 53/452 |
| 7,779,612 B2 | * | 8/2010 | Fergusson et al. | 53/451 |
| 2001/0002024 A1 | * | 5/2001 | Edwards | 220/705 |
| 2002/0023410 A1 | * | 2/2002 | Seaward et al. | 53/434 |
| 2010/0215813 A1 | * | 8/2010 | Peterson et al. | 426/106 |
| 2010/0218462 A1 | * | 9/2010 | Murray | 53/456 |

FOREIGN PATENT DOCUMENTS

EP 1338511 8/2003

* cited by examiner

*Primary Examiner* — Christopher Harmon
(74) *Attorney, Agent, or Firm* — Gifford, Krass, Sprinkle, Anderson & Citkowski, P.C.

(57) ABSTRACT

A method of forming and filling the pouch includes the steps of forming each panel and joining two panels by sealing together the side edges and lower edge. The method also includes the steps of opening the pouch and filling the pouch with the product. The method further includes the steps of closing the filled pouch by forming a first closing seal extending along an upper edge of the pouch a predetermined length from the upper edge, such that there is no dead space inside the pouch between the product and the first closing seal, and forming a second seal between the first closing seal and the upper edge thereby trapping the product between the first closing seal and the second closing seal, and finishing the pouch.

17 Claims, 6 Drawing Sheets

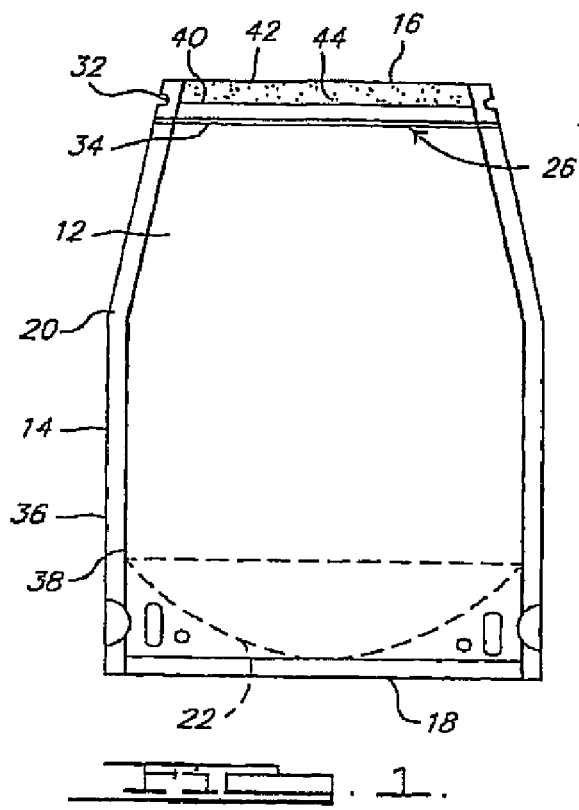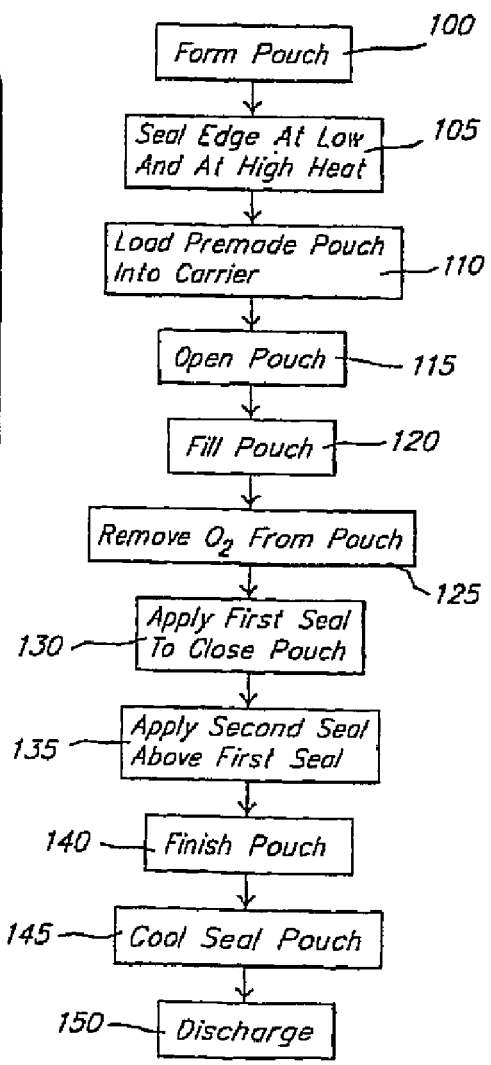

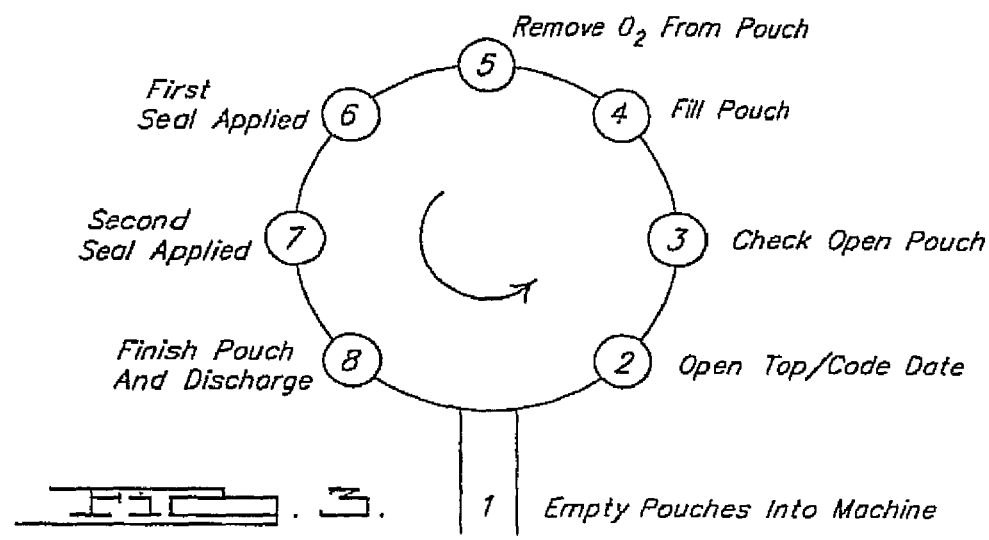
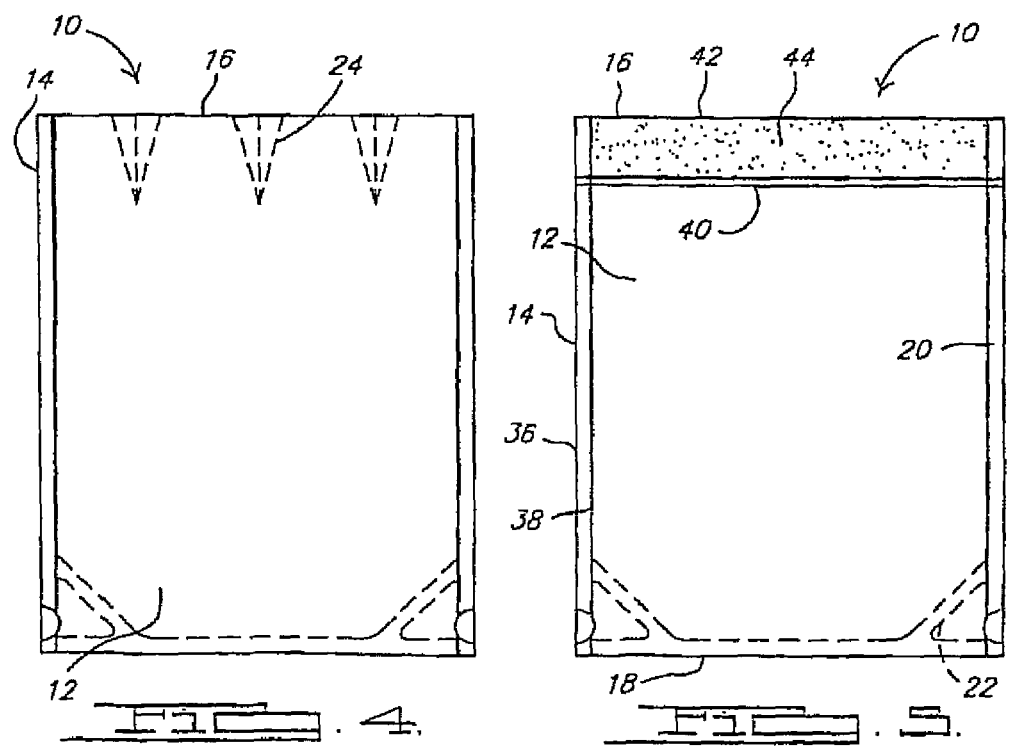

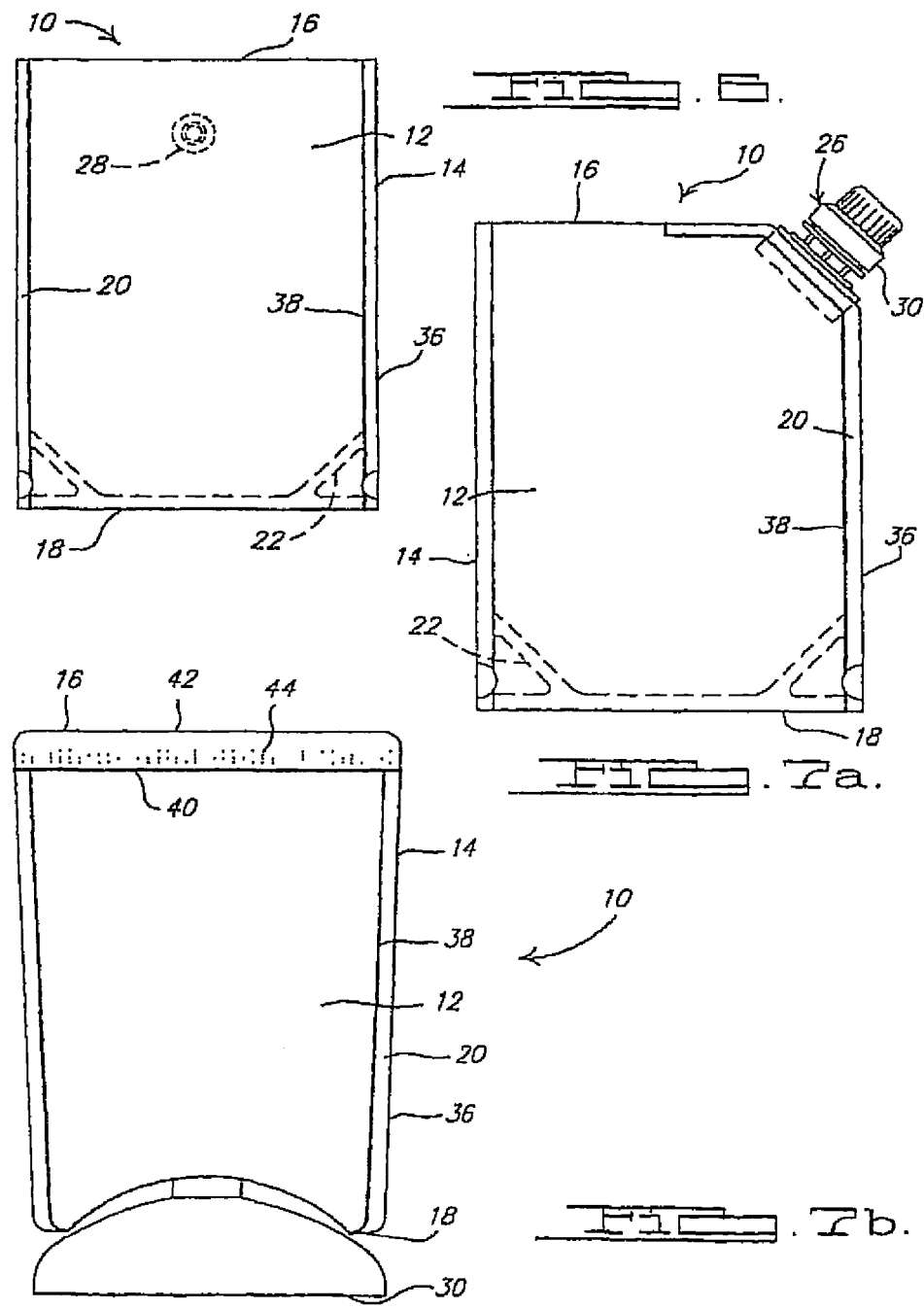

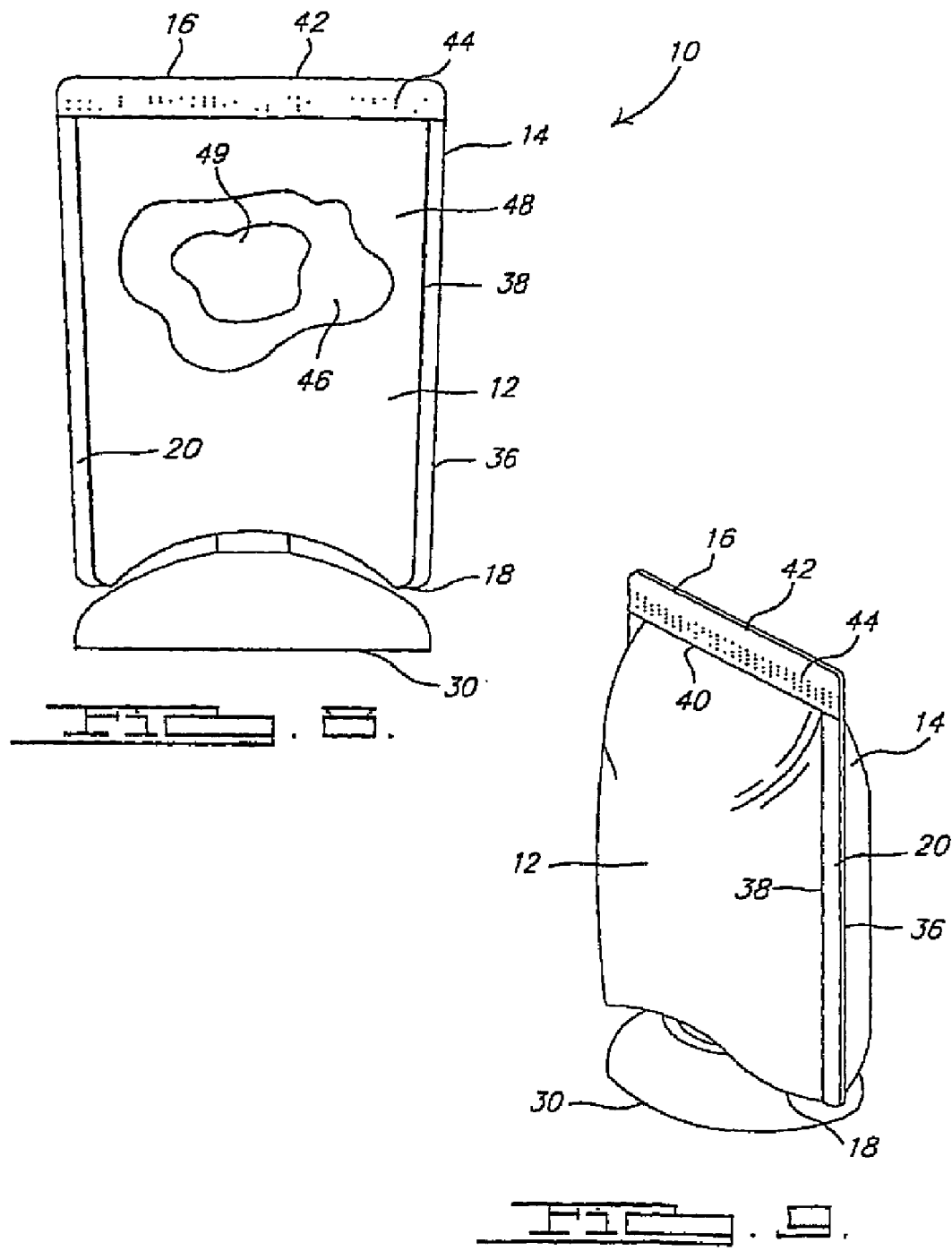

FLEXIBLE POUCH AND METHOD OF FORMING A FLEXIBLE POUCH

RELATED APPLICATION

This application is a Divisional of U.S. patent application Ser. No. 10/533,615 filed Apr. 29, 2005, which is the National Phase of PCT/US2003/034396 filed Oct. 30, 2003, which claims priority of U.S. Provisional Patent Application Ser. No. 60/422,282 filed Oct. 30, 2002, which is incorporated herein by reference.

BACKGROUND OF THE INVENTION

1. Field of the Invention

The present invention relates generally to flexible pouches for packaging a product and, more specifically, to a flexible pouch for packaging a product and a method of manufacturing the same.

2. Description of the Related Art

Various types of disposable, portable containers are known in the art for storing a fluid or dry product, such as a liquid, granular material, powder or the like. One example of such a container is a flexible pouch. Consumers prefer the convenience of flexible pouches, due to their shape, size and shelf life. Manufacturers recognize the packaging benefits of a flexible pouch, since the pouch can be formed and filled on the same manufacturing line. An example of a method and apparatus for filling a flexible pouch with a product is disclosed in commonly assigned U.S. Pat. No. 6,199,601, which is incorporated herein by reference.

The flexible pouch is made from a flexible material, preferably a laminate composed of sheets of plastic or aluminum or the like. In this example, the material is available in sheet form, on a roll. An outer layer of the material may include preprinted information, such as a logo, or the like, to provide the consumer with information regarding the contents of the pouch. The pouch may be formed using conventionally known manufacturing techniques, such as a horizontal form-fill seal machine, a flat bed pre-made pouch machine, a vertical form-fill machine, or the like. The pouch is generally formed by folding sheets of material over each other to achieve a predetermined shape. Edges, such as a side edge, are joined together using a sealing technique such as bonding or welding. Alternatively, the pouch is formed by laying one layer of material over a second layer of material and forming a gusset along two parallel edges to form a pouch capable of standing unsupported. An upper edge of the front panel and back panel is generally not sealed until after the pouch is filled. The empty pouch may be placed in a holder such as a cup or puck prior to the filling process. To fill the pouch, the upper edges of the pouch are spread apart. For example, a concentrated flow of gas is directed towards the upper edge of the pouch to separate the panels. Grippers may also be utilized at the same time to pull the panels apart. The pouch is filled, sealed and finished.

Flexible pouches have been used for some time to distribute non-carbonated beverages, such as fruit juice and the like. However, their use with carbonated beverages has been limited since the presently available materials are somewhat permeable, thereby allowing loss of the internal carbon dioxide gas from the pouch and its replacement with oxygen. The presence of oxygen in the filled pouch increases the chance of bacteria forming, or may affect the taste. Thus, there is a need in the art for a flexible pouch that can be used to distribute carbonated beverages and a method of making such a pouch.

SUMMARY OF THE INVENTION

Accordingly, the present invention is an improved flexible pouch for a product and an improved method for manufacturing and filling the pouch. The flexible pouch includes a front panel and a back panel each having an upper edge, a lower edge opposite the upper edge, and side edges extending therebetween the upper and lower edges. The pouch includes a first closing seal extending along an upper edge of the joined front and back panel formed a predetermined length from the open edge so that there is no dead space inside the pouch between the product and the first closing seal and a second closing seal outside the first closing seal, to form a pocket trapping some of the product between the first closing seal and the second closing seal.

The method includes the steps of forming each panel and joining two panels by sealing together the side edges and lower edge. The method also includes the steps of opening the pouch and filling the pouch with the product. The method further includes the steps of closing the filled pouch by forming a first closing seal extending along an upper edge of the pouch a predetermined length from the upper edge, such that there is no dead space inside the pouch between the product and the first closing seal, and forming a second seal between the first closing seal and the upper edge thereby trapping the product between the first closing seal and the second closing seal, and finishing the pouch One advantage of the present invention is that a flexible pouch and method of making a flexible pouch filled with a carbonated beverage is provided. Another advantage of the present invention is that a flexible pouch and method of making a flexible pouch filled with a carbonated beverage is provided that utilizes a laminate material which includes PET foil cast polypropylene. Still another advantage of the present invention is that the method of making a flexible pouch filled with a carbonated beverage includes seams that are heat sealed in a two-step process to eliminate gas, such as oxygen, in the head space of the pouch. A further advantage of the present invention is that a method of making a flexible pouch is provided that utilizes a low heat and a high heat weld to weld the seams. A still further advantage of the present invention is a flexible pouch and a method of making a flexible pouch filled with a carbonated beverage is provided that is cost-effective to manufacture. Yet a further advantage of the present invention is that the flexible pouch retains its shape as the product is removed.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is an elevational view of a flexible pouch, according to the present invention.

FIG. 2 is a flowchart of a method of forming and filling a flexible pouch, according to the present invention.

FIG. 3 is a block diagram of an apparatus for forming and filling a flexible pouch using the method of claim 2.

FIG. 4 is an elevational view of a pouch prior to filling, according to the present invention.

FIG. 5 is an elevational view of a pouch after sealing, according to the present invention.

FIG. 6 is an elevational view of the pouch with a fitment for a straw, according to the present invention.

FIGS. 7a and 7b are elevational views of pouches with spout fitments, according to the present invention.

FIG. 8 is an elevated view of a flexible pouch illustrating the material layers, according to the present invention.

FIG. 9 is a perspective view of a filled flexible pouch, according to the present invention.

DESCRIPTION OF THE PREFERRED EMBODIMENT(S)

Figure 10:
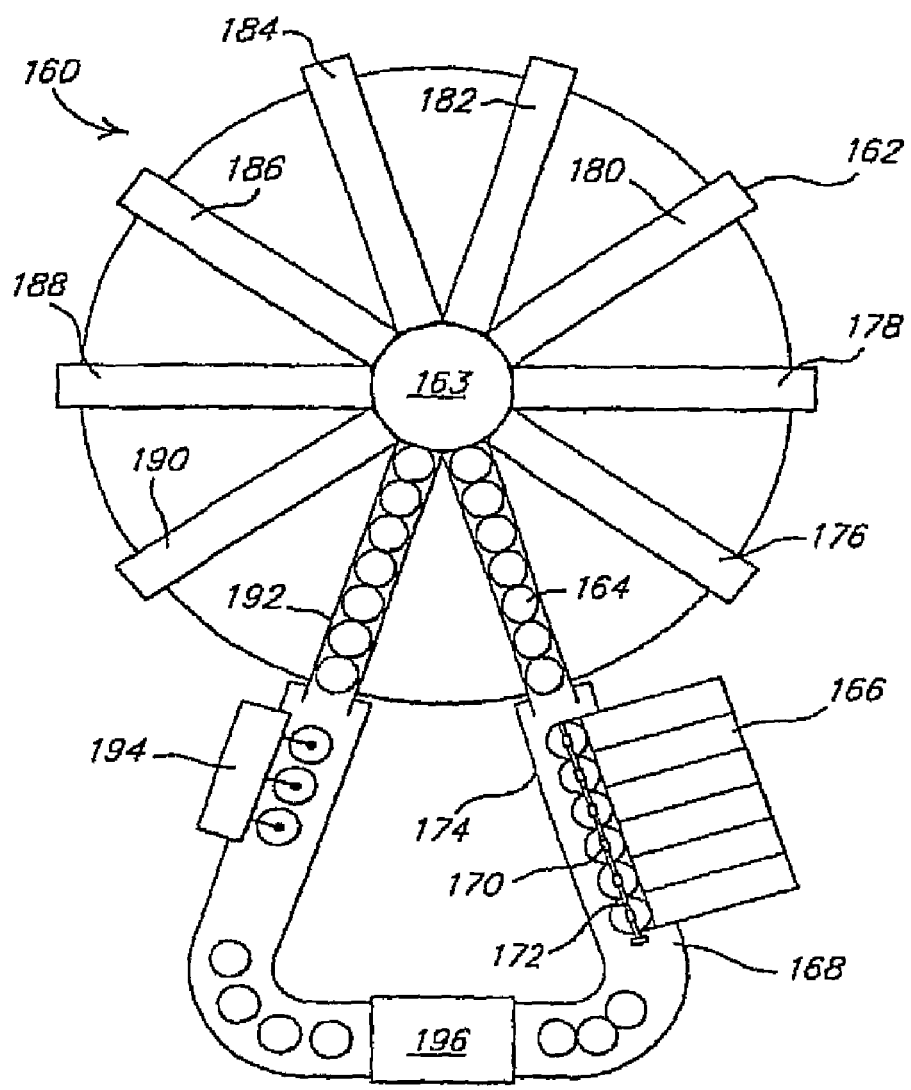
FIG. 10 is a schematic top view of a rotary fill machine according to the present invention.
Figure 11:
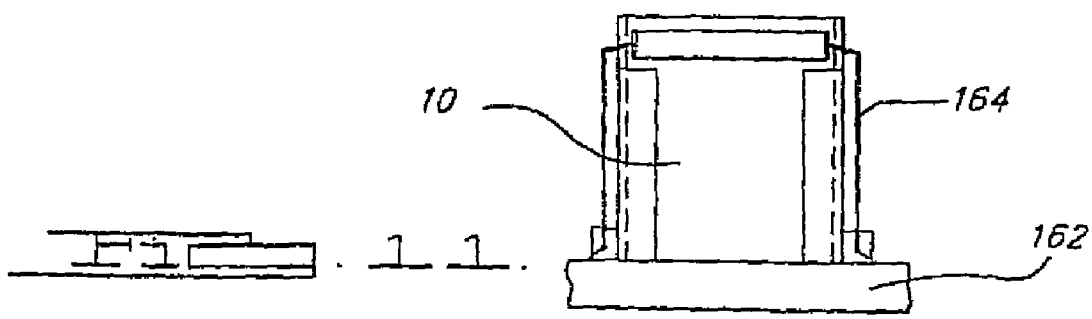
FIG. 11 is a cup carrying receptacle for use with the machine shown in FIGS. 10 and 12, according to the present invention.
Figure 12:
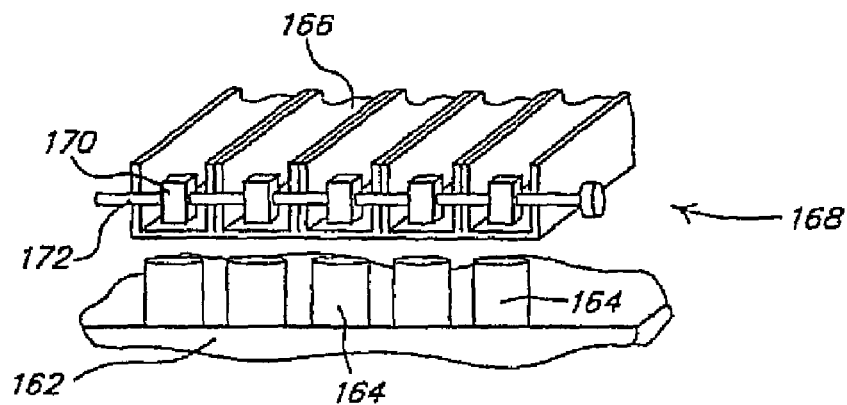
FIG. 12 is a servo feed device according to the present invention.

Referring to FIGS. 1-9, a sealed, flexible pouch 10 is illustrated. The pouch 10 is filled with a product (not shown) and sealed. In this example, it is contemplated that the product is a fluid which is carbonated, or one to which carbonation is added, such as juice, soda, an alcoholic beverage or the like. The pouch may contain a single serving of a product, or multiple servings. It is contemplated that the pouch illustrated in FIG. 1 contains a tear-off portion formed at the top for accessing the product contained therein. Alternatively, a fitment such as a removable and replaceable cap is mounted to the top portion or side portion of the pouch, as shown in FIGS. 7a and 7b through 9.

The pouch 10 is constructed by a front panel 12 and a back panel 14 that are joined together in a manner to be described, to form a pouch 10. In this example, each panel 10 has a generally rectangular shape, although other shapes are contemplated. Further, the panel is defined by an upper edge 16, an opposed lower edge 18, and side edges 20 extending therebetween the upper and lower edges 16, 18. The pouch 10 may include a sidewall 22 disposed between the side edges 20, the lower edge 18, or both the side and lower edges which allows the pouch 10 to stand upright. For example, the sidewall 22 may include a gusset formed in the sidewalls, which is generally wider at the lower edge and tapers upwardly towards the upper edge. Alternatively, the gusset may be formed between the lower edges to form a base for the pouch 10 to stand.

The flexible pouch 10 may advantageously includes a guide pocket 24 formed in a panel 14, 16 or wall of the pouch 10 prior to filling and sealing, to facilitate the separation of the front and back panels 14, 16 prior to the filling of the pouch 10. An example of such a pouch is disclosed in commonly assigned U.S. patent application Ser. No. 10/310,221.

The flexible pouch 10 is formed of laminate sheets as shown in FIG. 8, which provide a barrier against oxygen penetration and retains carbon dioxide within the pouch. In one embodiment, the laminate includes at least one layer 46 of virgin polyethylene terphalate (PET) and at least one layer 48 of aluminum foil and another layer 49 such as EVOM, PET or polyethylene. In a preferred embodiment, the laminate includes metalized foil paper layer 48 laminated to a cast polypropylene layer 46 and another layer 49 of PET, polyethylene or EVOM. It should be appreciated that there may be a fourth layer. The choice of layer material is driven by the product contained in the pouch 10. The laminate material may be either a 3 or 4 gauge material. The pouch 10 is particularly suited for packaging beer, wine or other carbonated fluids since the carbonation acts as a microbiocide and preserves the flavor and aroma of the products, as well as adding strength to the walls of the pouch. Advantageously, a pouch 10 made from the cast polypropylene laminate material retains its filled shape even as the product is removed from the pouch 10. Thus, the pouch can be shaped like a traditional cylindrical can, as shown in FIG. 9.

It should be appreciated that the pouch 10 may include other components or features, as is known in the art. For example, the pouch 10 may include a fitment 26 for dispensing the product from the pouch 10. Various types of fitments 26 are known in the art for this purpose. It should be appreciated that the fitments may be formed prior to filling the pouch. For example, the pouch 10 may include a fitment 26 for receiving a straw, as shown at 28 in FIG. 6. Another example of a fitment 26 is a spout fitment with cap, as shown at 30 in FIGS. 7a and 7b, and 8-9. Advantageously, the style of pouch may stand up on its own, as shown in FIG. 9. Alternatively, an upper edge 16 of the panel 14 may include a weakened area, to facilitate opening the pouch 10 by tearing off an upper portion of the top, as shown in FIG. 1 at 32. The pouch may include a resealable closing fitment 34, such as a zipper like that sold under the name TopTite™.

Referring to FIG. 2, a method for forming and filling the flexible pouch 10 using the apparatus described with respect to FIG. 3 is illustrated. The method begins in block 100 with the step of forming a pouch. For example, the panels 12, 14 that define the walls of the pouch 10 are formed in a panel cutting operation. The panels 12, 14 are made from a preprinted laminate of material, as previously described. The material is a laminate of layers 46, 48, preferably three. One layer of the material is preferably preprinted with information or locating indicia (not shown), such as a registration mark. The registration marks are located on the material to denote an edge of a panel 12, 14. The registration marks are read by an optical reading device (not shown), such as a scanner, to index the material in a predetermined position at the cutting station. The preprinted information may include labeling information that describes the product contained within the pouch. In this example, the layer of preprinted information is located on an outer layer of the material. The material is removed from the roll and cut into panels 12, 14. Each panel 12, 14 has a predetermined shape, which in this example is a rectangle. The material is cut into a panel 12, 14 using a known cutting apparatus, such as a laser or punch or the like.

Alternatively, the pouches 10 may be provided in a bandolier. In this type of apparatus, a strip of pouches arranged bottom to top is provided. The pouches 10 are sealed across the lower edge 18, so that they are sterile until a cut is made through them separating the two pouches 10 from one another and providing an opening at the top of one of the pouches 10. The lower edge 18 of the adjacent pouch is trimmed to shape, for example the corners may be angled. The cut may be performed using a cutter or a die cut or the like.

A crease or guide pocket 24 may be formed in a top portion of each panel 12, 14 in a creasing operation in order to facilitate opening and filling the pouch. A forming technique, such as stamping, may be utilized. Another example of a forming technique is the use of heated tubes that thermoform a crease 24 in each panel 12, 14.

When in registration, the upper edge 16 of each panel 12, 14 is positioned between one or more lower dies and corresponding diving upper dies. The upper die is mechanically moved first downwardly and then upwardly to stamp the predetermined shape into the top portion of each panel 12, 14. An example of a method of forming a crease in a panel to facilitate opening the pouch is disclosed in commonly assigned patent application Ser. No. 10/310,221, which is incorporated herein by reference. The methodology advances to block 105.

In block 105, edges of the pouch 10, such as the side edge 20 and lower edge 18, are joined together in a sealing operation. One edge is left open, preferably designated as the upper edge 16, in order to fill the pouch. In this example, the side and lower edges 18, 20 are joined together using an ultrasonic sealing process that includes the application of heat and compression in a two-step heat welding operation. A first seal 36 is slowly tack welded with a low heat, such as 180° F. to tack the two pieces of material together, so that steam is not released containing volatile materials such as ketones, butyls, butanes, or the like. The material may include resins, such as organoleptic resins which produce an undesirable taste in the product. The first seal 36 is relatively wide, such as 6 mm. After the slow low-heat weld, a second heat seal 38 is applied to the weld along the inner edge, and adjacent the contents. The second seal 38 has a width of approximately 2 mm, or one-third that of the first seal 36, and is heated to a higher temperature, such as 260° to provide strength.

It should be appreciated that the small width of the second seal 38 along with the relatively short heating time at approximately half of the preheat results in minimizing the gasses created during the process. The second heat seal 38 provides strength to retard the high pressure that is created by the sealing process. The seals 36, 38 are immediately cooled to stabilize the pouch 10.

It should be appreciated that this heat sealing process may be applied to any one of the edges 16, 18. If a fitment 26 is also applied, the process may be modified slightly. For example, if a reclosable pouch is desired, a reclosing means 34, such as a zipper provided by Zip Tight is applied. This type of zipper is easily opened from the outside, however, it provides resistance to pressure on the inside, and the greater the pressure on the inside, the tighter the zipper is sealed. The fitment 26 is located on the pouch 10 in a variety of locations, such as mounted on a bottom, or a top, or a side portion of the pouch. Various types of fitments are contemplated, including the spout fitments illustrated in FIGS. 7a and 7b. The methodology advances to block 110.

In block 110, the pre-made pouch 10 is then loaded into a carrier. In this example, the pouch 10 is placed in a holder (not shown). An example of a holder is a cup-shaped member, as disclosed in commonly assigned U.S. patent application Ser. No. 10/336,601, which is incorporated herein by reference. Alternatively, the pouch 10 may be held with grippers (not shown) as is known in the art. The methodology advances to block 115.

In block 115, the pouch 10 is opened in an opening operation. Various techniques are conventionally known in the art for opening the pouch 10. For example, the guide pocket 24 formed by the crease in the front panel 12 and back panel 14 facilitate opening of the pouch. A nozzle (not shown) may be mechanically lowered into the guide pocket 24 to direct a stream of compressed gas into the guide pocket 24, to force the walls of the pouch 10 away from each other. An example of a gas is carbon dioxide or nitrogen. The blowing station may include a manifold, with a hood extending over the top of the edges of the pouch as known in the art. The manifold has rows of apertures (not shown) formed above the upper edges 16 of the panels 12, 14 of the pouch 10. The hood is placed over the pouch 10 to assist in maintaining the air pressure in the pouch 10. The supply of pressurized gas is directed through the aperture to form a plurality of jets of pressurized gas or air. The jets are directed downwardly at the diamond-shaped openings formed at the upper edges 16 to assist in overcoming the surface tension of the panels 12, 14 and assist in separation of the panels 12, 14. A diving rod (not shown) may then be used to make sure the pouch 10 is fully opened. The methodology advances to block 120.

In block 120, the pouch 10 is filled with the product in a filling operation. For example, a fill tube (not shown) is lowered into the opened pouch 10 and the product is dispensed into the open pouch 10.

If the product is naturally carbonated, such as beer or soda or the like, the pouch is preferably filled while immersed in a nitrogen bath. If the product is not naturally carbonated, it is immersed in a carbon bath to introduce carbon dioxide into the product, such as carbonator or the like. For example, carbon dioxide is introduced into water or juice to provide a carbonated beverage. The product may contain a mixture of up to two volumes of carbon dioxide. It should be appreciated that the carbon dioxide masks any undesirable taste from the ketones released during the sealing process. The carbon dioxide also increases the pressure within the product so that the walls of the pouch are rigid after the top is sealed. The product is preferably filled at a temperature ranging from 29° F. to ambient temperature.

The methodology advances to block 125 and the oxygen is removed from the pouch. For example, the carbon dioxide in the product is released and rises to the top of the pouch and into the nitrogen bath. The presence of carbon dioxide and nitrogen in a product, such as water, prohibits the growth of bacteria and the formation of mold, as well as enhancing the flavor and aroma of the product. The methodology advances to block 130.

In block 130, the upper edge 16 of the pouch is closed by applying a first closing seal 40. In this example, the pouch is closed by sealing the upper edges 16 together using an ultrasonic weld involving the application of heat and pressure. The location of the first closing seal 40 is selected so that some of the product in the upper portion of the pouch 10 is trapped above the first closing seal 40, such as 1 inch from the top as shown in FIG. 5. It should be appreciated that the sealing process removes the guide pocket 24 from the panels 12, 14. Any gas present in the pouch 10 is relatively insoluble when cold and provides strength to the walls, rigidity to the pouch, and may be pressurized up to four volumes of gas. The methodology advances to block 135.

In block 135, a second closing seal 42 is placed through the top of the pouch, above the first seal. It should be appreciated that the location of the seal is selected so that some of the product in the upper portion of the pouch is trapped between the first closing seal 40 and the second closing seal as shown at 44. The result is that the pouch 10 is 100% product, with no gas, such as oxygen, present in the head space. The head space is the empty region between the product and the heat seals. The second seal may be a cosmetic seal. The methodology advances to block 140.

In block 140, the pouch 10 is finished in a finishing operation. The edges 16, 18, 20 of the pouch 10 are trimmed to achieve a predetermined shape. The methodology advances to block 145, and the pouch 10 is finished at a cooling station, where the pouch 10 is cooled using a conventionally known cooling technique. The methodology advances to block 150.

In block 150 the finished pouch 10 is discharged from the machine.

It should be appreciated that the methodology may include other steps, such as an upstream oxygen purging station, a downstream oxygen purging station, or the like. In addition, a manufacturing station may perform one or a plurality of operations, to enhance the efficiency of the methodology and apparatus.

Referring to FIGS. 3 and 10-13, a machine for carrying out the method described with respect to FIG. 2 is illustrated. Various styles of machines are contemplated for filling the pouch 10. These include a turret-type machine, or a continuous motion cup receptacle machine, or an intermittent machine. For carbonated beverages, a fill-seal machine 160 is preferably used to fill stand-up pouches. As shown in FIG. 10, the machine 160 is of a turret-type having radially extending arms 162. Each arm 162 carries a predetermined number of cuplike receptacles 164. As shown in FIG. 9, the receptacles 164 have a cylindrical wall extending upwardly from a bottom, as disclosed in co-pending Patent Application No. 60/345,230. There may be up to ten receptacles 164 on each arm 162.

The pouches 10 are made using a novel method on a flat bed or horizontal form-fill machine. The cups are delivered to a loading station by conveyor where empty pouches are loaded into the receptacles from magazines 166 onto a rotary turret 163, as shown in FIG. 10. The pouches 10 are fully formed but the upper edges 16 of the panels 12, 14 are unsealed. Each magazine 166 or turret segment holds a supply of empty flat pouches 10. The same number of magazines or segments are needed as the number of receptacles 164, which will be loaded onto the arm 162 of the turret. The magazines are positioned side by side with the receptacles 164 below. As shown in FIG. 10, a linear cam servo feed-in device 168 moves to push an empty pouch 10 from the magazine 166 into a receptacle 162 positioned beneath the magazine 166. The cam 170 engages the top pouch. The magazines are angled so that gravity pulls the pouches 10 downwardly to the cam 170 which pushes against the bottom pouch in the magazine and is rotated to slide the pouch from the magazine downwardly into the corresponding awaiting receptacle 164. The cams 170 are mounted to a single rod 172 which is rotated to move the cams in unison. The rotary turret picks a pouch 10 horizontally from the magazine 166 and loads onto a segment which transfers the empty pouch into the receptacle 164.

The group of receptacles 164 is then fed by the conveyor 174 sideways onto a radial arm 162 of the turret 163. The arms 162 are sequentially indexed through a number of stations. The turret 163 is rotated to move the receptacles 164 containing the pouches 10 to an opening station 176 where the flat pouches 10 are opened by a group of nozzles positioned above the pouches 10. The pouches 10 then are moved to a checking station where photocells or pressure is used to make sure the pouches have been opened, 178. The pouches 10 then move to a first filling station 180 where pouches could be evacuated and diving nozzles are lowered into the pouch 10 to fill the pouch 10 with beverage. In the case of larger pouches, it may be necessary to move the pouches to a second fill station 182 to complete the filling of the pouch. When filling the pouches with beer, the beer must be filled cold at 29°. The pouches 10 then are moved to a station 184 where any oxygen in the pouch residing above the beverage is removed. This can be done by providing a hood or diving nozzle where oxygen is either evacuated or replaced with carbon dioxide or nitrogen into the pouch to displace the oxygen. A diving nozzle is used to inject the gas.

The pouches 10 are then moved to a first pouch closing station 186 where an ultrasonic sealing apparatus pushes the upper edges 16 of the panels 12, 14 together over the product and ultrasonically seals the panels 12, 14 together, as previously described. The ultrasonic sealing process causes the carbonated beverage, such as beer, to produce a small amount of foam on the top of the beverage. As shown in FIG. 5, this foam forces excess oxygen upwardly, the first closing seal 40 is formed across the foam at the top of the liquid to ensure that no oxygen remains in the container. The pouch is then moved to a second pouch closing station 188 where a second closing seal 42 is formed above the first closing seal. The second closing seal 42 traps the risen foam between the first and second seals. The second closing seal 42 may be a cosmetic heat seal used to seal the top edges of the pouch together. The pouches are then moved to a finishing station 190. The pouches 10 may be cooled or an additional top seal may be placed over the previous two seals.

Finally, the pouches are moved to a discharge station 192 as shown in step 8 where the receptacles 164 are moved from the arm 162 of the turret 163 outwardly onto the conveyor 174. The receptacles 164 are then moved by the conveyor 174 under robotic arms 194 having grippers which are then lowered to grab the pouch 10 and lift the pouch 10 from the receptacles 164. The receptacles 164 are then moved by the conveyor 174 through a rinsing station 196 and returned to the other side of the turret for use. The pouches 10 are placed by the grippers into cartons. At this point, the filled pouch is available for refrigerated distribution as fresh product. The filled pouch 10 may be placed onto another conveyor belt for additional processing, such as tunnel pasteurization for shelf stabilization. In certain instances, it may be desirable to apply steam to sterilize the pouch 10 and to wet the inner surface of the walls to facilitate handling.

Figure 13:
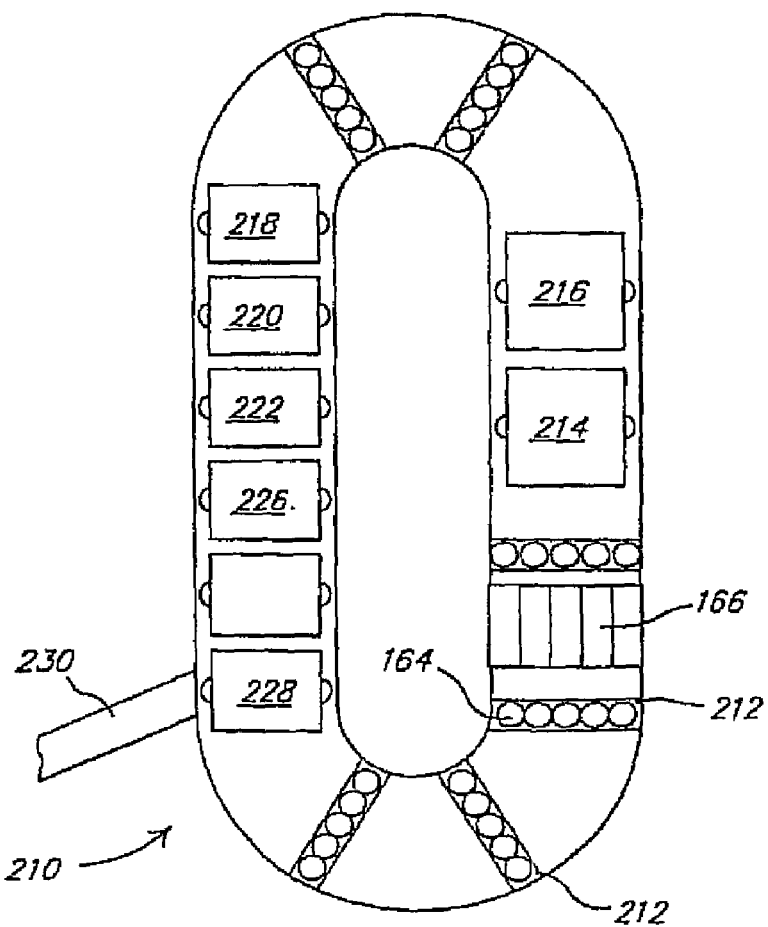
FIG. 13 is a schematic top view of a continuous fill machine in accordance with the invention.

As shown in FIG. 13, the pouches 10 may be filled on a continuous motion machine 210. The continuous motion machine has rows 212 of receptacles 164 mounted to a conveyor which are moved in an elliptical path past the same stations as set forth for the rotary machine above. Up to ten receptacles may extend across a row. Preformed pouches are fed from magazines located above the receptacles.

The various operations such as opening, checking, filling and sealing are performed by apparatus which move over the receptacles at the same speed as the receptacles. Two sets of identical equipment such as opening equipment are utilized. The first set travels with the belt performing the operation while a second set is lifted upwardly by a chain along a frame and then moved rearwardly and down to the start position where it meets the next row of receptacles. The pouches are loaded into the receptacles and then moved to the start of the opening station 214 where blowers are moved down and travel with the pouches while the alternate set of blowers are moved upwardly and rearwardly. At the end of the travel through the opening station, the pouches are fully opened by diving wands 216. The pouches are then turned 180° to travel back down through the apparatus where they are moved sequentially through an evacuation station 218, fill station 220, closing station 222, sonic seal station 224 and top seal station 226. At the opposite end of the machine, the robotic arms 228 move downwardly, grab the pouches and move them to a conveyor for loading into packaging. The pouches then are rotated 180° to the start position and the receptacles may be washed as they move around to the start position.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of forming and filling a flexible pouch for packaging a product, said method comprising the steps of:
   forming a panel having an upper edge, a lower edge opposite the upper edge, and side edges extending therebetween the upper and lower edges;
   joining two panels by sealing together the side edges and lower edge;
   opening the pouch;
   filling the pouch with the product;
   closing the filled pouch by forming a first closing seal extending along an upper edge of the pouch a predetermined length from the upper edge, such that there is no dead space inside the pouch between the product and the first closing seal;
   subsequently forming a second closing seal between the first closing seal and the upper edge, wherein some of the product is trapped between the first closing seal and the second closing seal, and wherein the upper edges of the panels are sealed together by the second closing seal; and
   finishing the pouch.

2. The method as set forth in claim 1, wherein the panel is formed from a laminate material including a metalized foil paper layer and a cast polypropylene layer.

3. The method as set forth in claim 1 wherein said step of joining the panel together further includes the steps of applying a first seal at low temperature positioned along the side edges and the lower edge of the panels and applying a second seal at a higher temperature positioned adjacent the first seal and the product.

4. The method as set forth in claim 1 wherein said step of joining the lower and side edges of the pouch together includes the step of sealing the edges using a combination of heat and pressure.

5. The method as set forth in claim 1 wherein said first closing seal is an ultrasonic weld.

6. The method as set forth in claim 1 further comprising the step of inserting a fitment in the pouch panel for dispensing the product from the pouch.

7. The method as set forth in claim 6 wherein said fitment is a resealable, interlocking closing means.

8. The method as set forth in claim 6 wherein said fitment is a screw-on cap.

9. The method as set forth in claim 1 wherein said product is a carbonated beverage.

10. A method of forming and filling a flexible pouch for packaging a carbonated product, said method comprising the steps of:
    forming a panel having an upper edge, a lower edge opposite the upper edge, and side edges extending therebetween the upper and lower edges;
    joining two panels by sealing together the side edges and lower edge by applying a first seal at low temperature along the side edges and lower edge and applying a second seal at a higher temperature adjacent the first low temperature seal and the product;
    opening the pouch;
    filling the pouch with the product;
    closing the filled pouch by forming a first closing seal extending along an upper edge of the pouch a predetermined length from the upper edge, such that there is no dead space inside the pouch between the product and the first closing seal;
    subsequently forming a second closing seal between the first closing seal and the upper edge, wherein some of the product is trapped between the first closing seal and the second closing seal, and wherein the upper edges of the panels are sealed together by the second closing seal; and
    finishing the pouch.

11. The method as set forth in claim 10, wherein the panel is formed from a laminate material including a metalized foil paper layer and a cast polypropylene layer.

12. The method as set forth in claim 10 wherein said first closing seal is an ultrasonic weld.

13. The method as set forth in claim 10 further comprising the step of inserting a fitment in the pouch for dispensing the product from the pouch.

14. The method as set forth in claim 13 wherein said fitment is a resealable, interlocking closing means.

15. The method as set forth in claim 10 wherein said fitment is a screw-on cap.

16. The method as set forth in claim 10 wherein the first low temperature seal is at about 180° F. and the second high temperature seal is at about 260° F.

17. The method as set forth in claim 16 wherein the first low temperature seal has a greater width than the second high temperature seal.

* * * * *